(12) United States Patent
Engle et al.

(10) Patent No.: US 10,890,315 B2
(45) Date of Patent: Jan. 12, 2021

(54) UNIVERSAL MOUNTING ASSEMBLY

(71) Applicant: Hubbell Incorporated, Shelton, CT (US)

(72) Inventors: Joseph Engle, Taylors, SC (US); Thomas Holscher, Simpsonville, SC (US); Benjamin Rowland, Irmo, SC (US)

(73) Assignee: Hubbell Incorporated, Shelton, CT (US)

( * ) Notice: Subject to any disclaimer, the term of this patent is extended or adjusted under 35 U.S.C. 154(b) by 142 days.

(21) Appl. No.: 15/879,036

(22) Filed: Jan. 24, 2018

(65) Prior Publication Data

US 2018/0209620 A1  Jul. 26, 2018

Related U.S. Application Data

(60) Provisional application No. 62/449,728, filed on Jan. 24, 2017.

(51) Int. Cl.

| *F21V 21/00* | (2006.01) |
| *F21V 19/00* | (2006.01) |
| *F21V 23/00* | (2015.01) |
| *F21V 17/00* | (2006.01) |
| *F16M 13/00* | (2006.01) |
| *F21V 21/112* | (2006.01) |
| *F16M 13/02* | (2006.01) |
| *F21V 21/02* | (2006.01) |
| *F21V 21/03* | (2006.01) |
| *F21V 21/116* | (2006.01) |

(Continued)

(52) U.S. Cl.
CPC .......... *F21V 21/112* (2013.01); *F16M 13/02* (2013.01); *F16M 13/027* (2013.01); *F21V 21/02* (2013.01); *F21V 21/03* (2013.01); *F21V 21/116* (2013.01); *F21V 21/04* (2013.01); *F21V 21/10* (2013.01)

(58) Field of Classification Search
CPC ........ F21V 21/112; F21V 21/02; F21V 21/03; F21V 21/116; F21V 21/04; F21V 21/10; F16M 13/02; F16M 13/027
See application file for complete search history.

(56) References Cited

U.S. PATENT DOCUMENTS

| 2,195,013 A | 3/1940 | Rastetter et al. |
| 7,588,222 B1 | 9/2009 | Feldberg |

(Continued)

OTHER PUBLICATIONS

PCT/US2018/015038 International Search Report and Written Opinion dated Mar. 23, 2018 (16 page).

*Primary Examiner* — Tan Le
(74) *Attorney, Agent, or Firm* — Michael Best & Friedrich, LLP (57) ABSTRACT

A luminaire mounting assembly includes a top mounting component having a top body defining an interior chamber and configured to receive a luminaire. The top mounting component is configured to be connected to a horizontal support and configured to be connected a pendant mount. A side mounting component includes a base configured to connect to a vertical support and a body portion extending from the base. The body portion is configured to connect to the top mounting component. A stanchion adaptor is configured to connect to the side mounting component and includes a stanchion opening configured to receive a stanchion mount.

21 Claims, 9 Drawing Sheets

(51) Int. Cl.
*F21V 21/10* (2006.01)
*F21V 21/04* (2006.01)

(56) References Cited

U.S. PATENT DOCUMENTS

| | | | |
|---|---|---|---|
| 8,061,666 B1* | 11/2011 | Fortin | F21S 8/086 |
| | | | 248/219.1 |
| 9,175,839 B2* | 11/2015 | Oquendo, Jr. | F21V 21/116 |
| 9,316,365 B1* | 4/2016 | Ko | F21L 4/02 |
| 9,835,314 B1* | 12/2017 | Wright | F21V 17/10 |
| 2006/0260835 A1 | 11/2006 | Johnson et al. | |
| 2015/0188301 A1* | 7/2015 | Rogers | H02G 3/30 |
| | | | 174/535 |
| 2015/0219320 A1 | 8/2015 | Durdle et al. | |
| 2016/0281967 A1 | 9/2016 | Hunt, III et al. | |
| 2016/0363300 A1 | 12/2016 | Ma | |
| 2017/0016601 A1 | 1/2017 | Pouladian et al. | |

* cited by examiner

UNIVERSAL MOUNTING ASSEMBLY

RELATED APPLICATION(S)

This application is based on U.S. Provisional Application Ser. No. 62/449,728, filed Jan. 24, 2017, the disclosure of which is incorporated herein by reference in its entirety and to which priority is claimed.

FIELD

Various exemplary embodiments relate to mounting assemblies for luminaires.

BACKGROUND

Light fixtures, or luminaires, are used with electric light sources to provide an aesthetic and functional housing in both interior and exterior applications. For example, high bay luminaires can be used in larger open indoor environments such as heavy industrial settings, warehouses, gyms, churches, and shopping malls.

SUMMARY

According to an exemplary embodiment, a luminaire mounting assembly includes a top mounting component having a top body defining an interior chamber and configured to receive a luminaire. The top mounting component is configured to be connected to a horizontal support and configured to be connected a pendant mount. A side mounting component includes a base configured to connect to a vertical support and a body portion extending from the base. The body portion is configured to connect to the top mounting component. A stanchion adaptor is configured to connect to the side mounting component and includes a stanchion opening configured to receive a stanchion mount.

According to another exemplary embodiment, a luminaire mounting assembly includes a top mounting component having a top wall and a side wall extending from the top wall. The top wall and side wall define an interior chamber. The side wall includes a recessed portion. A hook and attachment component extend from the sidewall to connect a luminaire to the top mounting component. A side mounting component includes a base and a body portion extending from the base. The body portion is configured to connected to the recessed portion of the top mounting component side wall. A stanchion adaptor includes an adaptor body having a top wall, a bottom wall, an opening extending between the top wall and the bottom wall, and a rim positioned in the opening.

Another exemplary embodiment includes a method of mounting a luminaire. A mounting configuration is selected for a luminaire. A luminaire mount comprising one or more of a top mounting component, a side mounting component, a first stanchion adaptor, and a second stanchion adaptor is assembled based on the selected mounting configuration. The assembled luminaire mount is connected to a structure. A luminaire is connected to the luminaire mount.

BRIEF DESCRIPTION OF THE DRAWINGS

The aspects and features of various exemplary embodiments will be more apparent from the description of those exemplary embodiments taken with reference to the accompanying drawings, in which.

DETAILED DESCRIPTION OF EXEMPLARY EMBODIMENTS

Various exemplary embodiments are directed to a set of components that can be used to connect a luminaire to different mounting features. For example, a set of components can be provided, and a portion of the components can be selected and used to connect a luminaire to an overhead structure, such as a ceiling, a pendant mount, a wall mount, a straight stanchion mount, and an angled stanchion mount.

Figure 1:
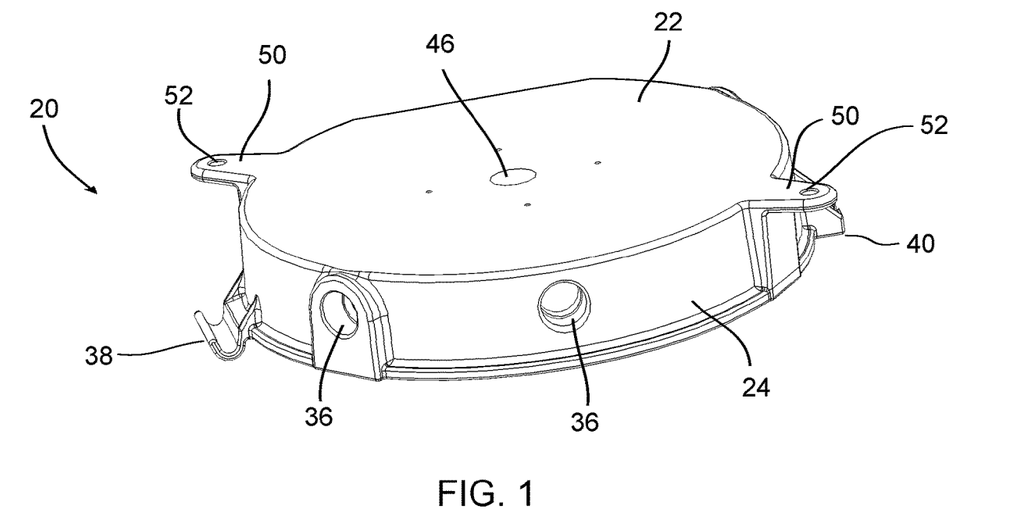
FIG. 1 is a top perspective view of an exemplary top mounting component.
Figure 2:
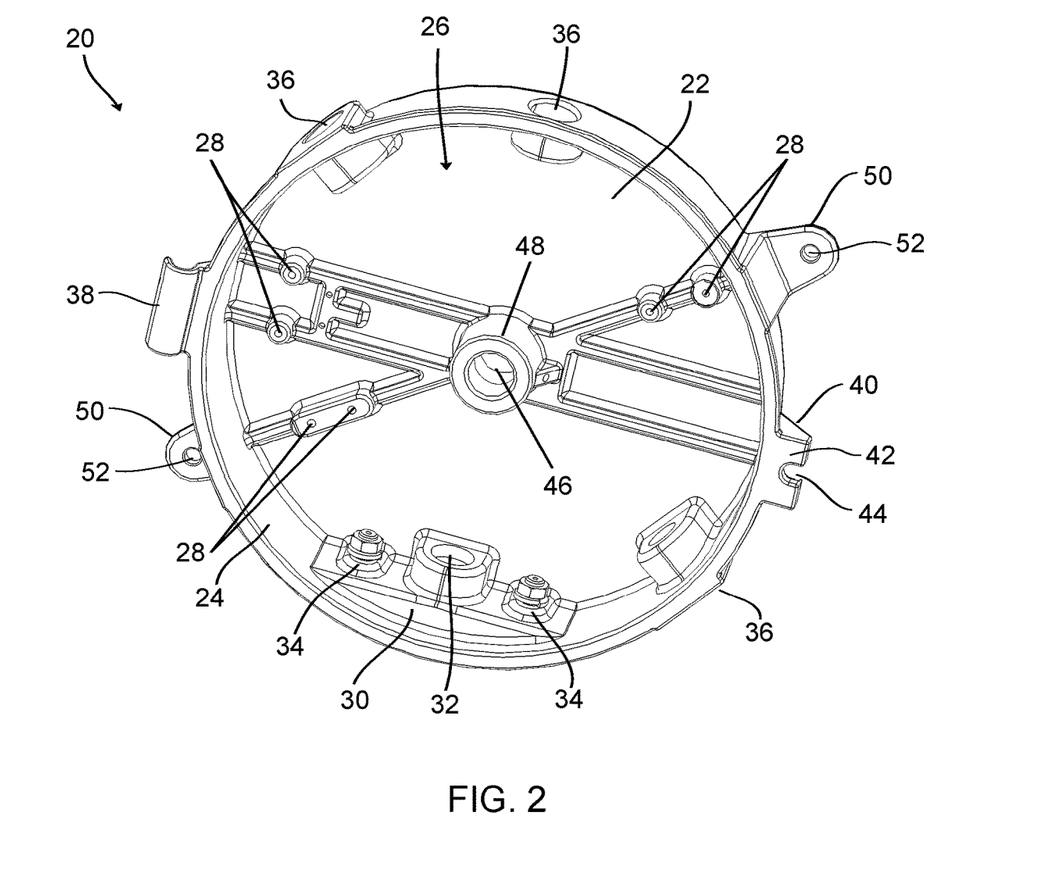
FIG. 2 is a bottom perspective view of FIG. 1.
Figure 3:
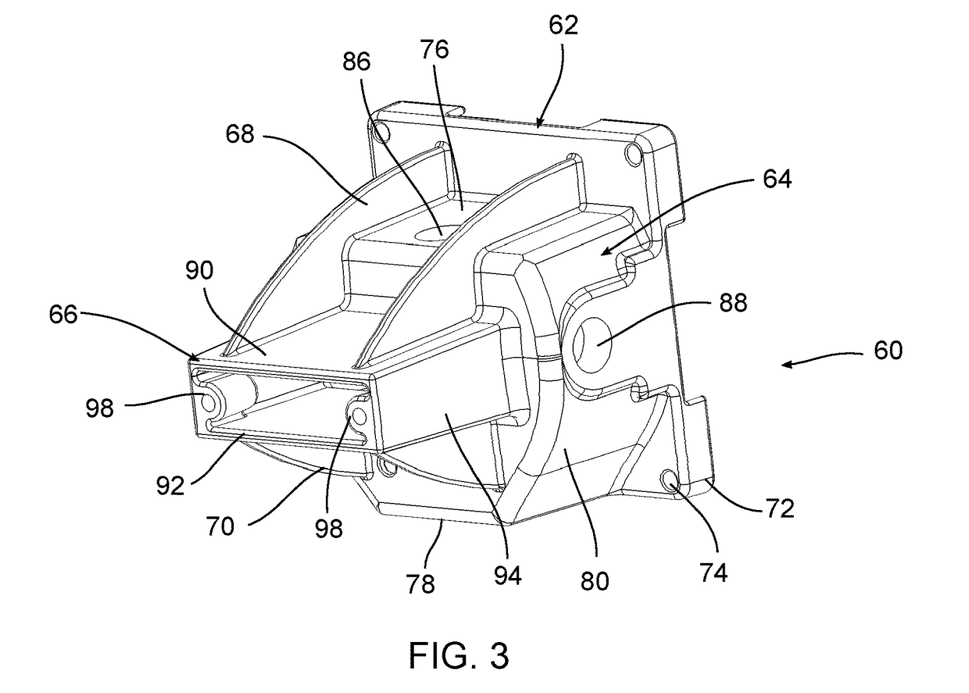
FIG. 3 is a front perspective view of an exemplary side mounting component.
Figure 4:
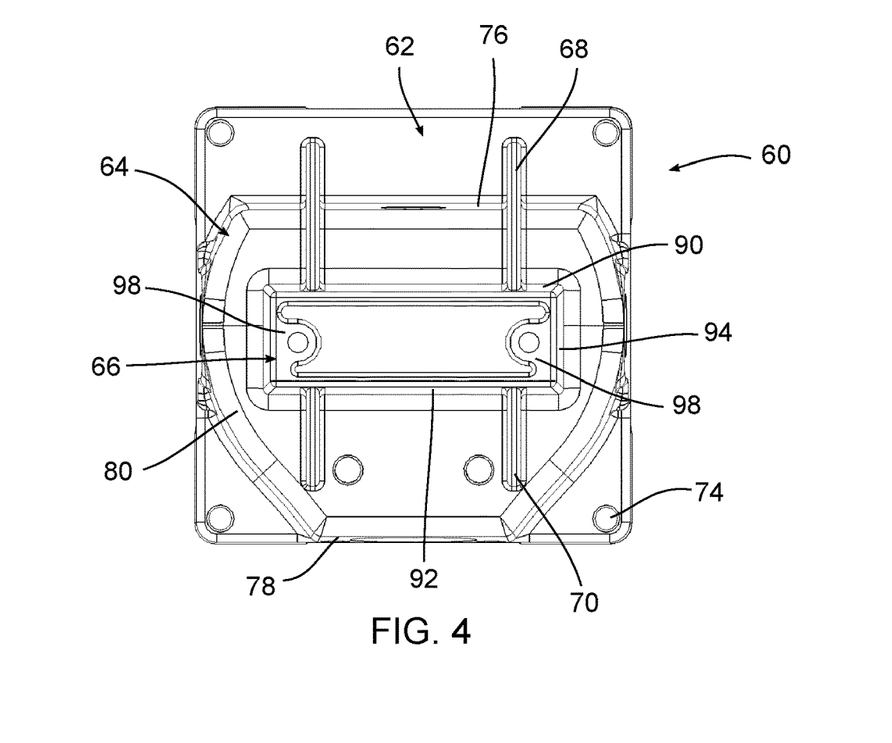
FIG. 4 is a front view of FIG. 3.
Figure 5:
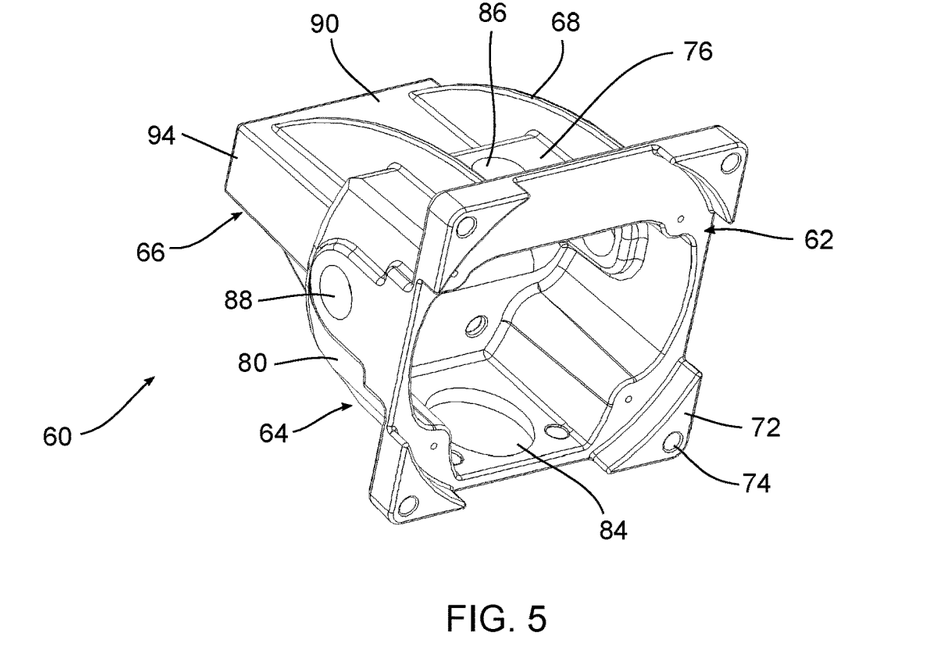
FIG. 5 is a rear perspective view of FIG. 3.
Figure 6:
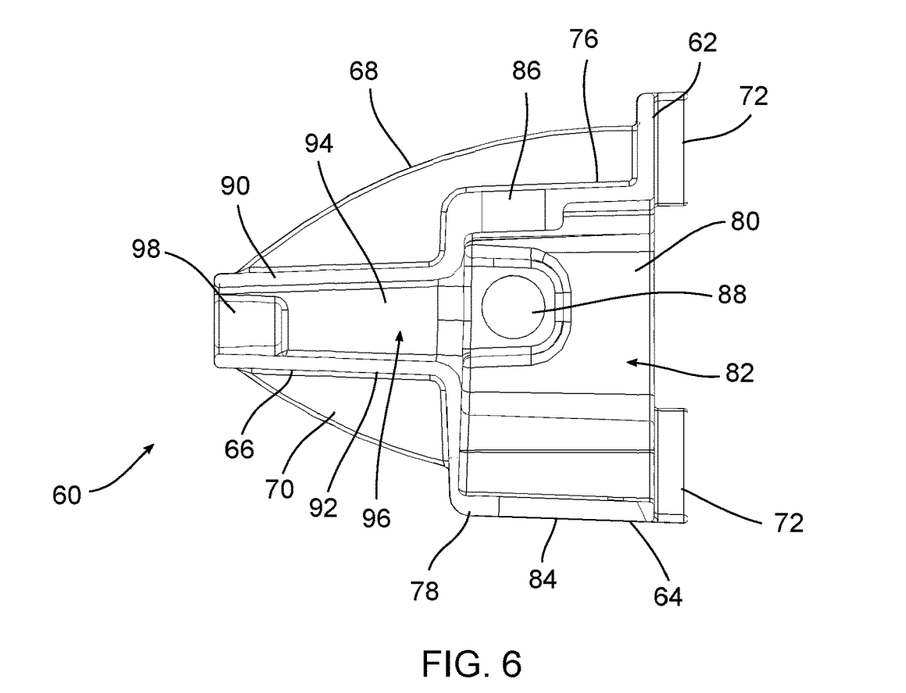
FIG. 6 is a sectional, side view of FIG. 3.

FIGS. 1 and 2 show an exemplary embodiment of a top mounting component 20 having a circular top wall 22 and a curvilinear side wall 24 extending from the top wall 22. The top wall 22 and the side wall 24 each include an exterior surface and an interior surface and combine to form a body having a substantially cylindrical configuration at least partially defining an interior chamber 26. A series of connecting features 28 extend from the interior surface of the top wall 22. The connecting features 28 can be used to attach or ground control-components to the top mounting component 20. Exemplary control components can include drivers, sensors, fuses, communication units, etc.

The side wall 24 includes a recessed portion 30 having a substantially rectangular configuration. The recessed portion 30 includes a conduit opening 32 and a pair of fastener openings 34. Secondary conduits 36 are positioned around the side wall 24 at locations spaced form one another and from the conduit opening 32. The exemplary embodiment shows three secondary conduits 36, although more or fewer can be included. Plugs (not shown) can be placed in the secondary conduits when they are not in use.

A hook 38 and an attachment component 40 extend from the side wall 24, for example at a bottom portion of the side wall 24, with the hook 38 positioned opposite the attachment component 40. The attachment component can include a flange 42 and an opening 44 for receiving an attachment mechanism, for example a fastener. A luminaire can be configured to pivotally connect to the hook 38 and be rotated from a first position hanging from the hook 38 to a second position where a fastener can connect the luminaire to the attachment component 40. During installation, a luminaire (not shown) is first connected to hang from the hook 38 and wiring connections can be made to the luminaire without an installer having to support the luminaire. The luminaire is then rotated into a position to connect the luminaire to the attachment component 40.

A central opening 46 is provided in the top wall 22 and is partially defined by a cylindrical boss 48 extending from the interior surface of the top wall 22 into the interior chamber 26. The central opening 46 can be threaded and can receive a pendant support (not shown). The pendant support can be a hollow cylindrical post or cable that supports the luminaire and acts as a conduit for one or more conductors.

A pair of arms 50 extend radially from the side wall 24 and the top wall 22 away from the interior chamber 26. Each arm 50 has a top surface that is substantially planar with the exterior surface of the top wall 22. Each arm 50 also includes an opening 52. The opening 52 can receive a fastener that is used to connect the top mounting component 20 to a structure or support, typically a horizontal support surface (i.e., a ceiling or other overhead structural support extending substantially parallel to a general lighted area).

FIGS. 3-6 show an exemplary embodiment of a side mounting component 60 that can be connected to the recessed portion 30 of the top mounting components 20. The side mounting component 60 includes a base 62, a first body portion 64, and a second body portion 66. A pair of upper ribs 68 extend from the base 62 to the second body portion 66 and a pair of lower ribs 70 extend from the first body portion 64 to the second body portion 66.

The base 62 has a substantially rectangular configuration with a central opening providing communication with the first body portion 64. A foot 72 is positioned at each corner of the base 62 and an aperture 74 extends through each foot 72. The base 62 can be connected to a structure or support, typically a vertical support surface (i.e., a wall or other side structural support extending substantially perpendicular to a general lighted area).

The first body portion 64 extends between the base 62 and the second body portion 66. The first body portion 64 has a trapezoidal configuration with a top wall 76, a bottom wall 78, and curved side walls 8o that at least partially define a first chamber 82 in communication with the rear opening defined by the base 62. A cross-sectional area of the first body portion 64 is smaller than the base 62. The first body portion 64 includes a bottom opening 84, a top opening 86, and a pair of opposite side openings 88.

The second body portion 66 extends from the first body portion 64. The second body portion 66 has a rectangular configuration with a top wall 90, a bottom wall 92, and a pair of side walls 94 that at least partially define a second chamber 96 in communication with the first chamber 82. A cross-sectional area of the second body portion 66 is smaller than the base 62 and smaller than the first body portion 64. An end of the second body portion 66 includes one or more connecting features for connecting the side mounting component 60 with the top mounting component 20. For example, the second body portion 66 includes a first and second threaded bosses 98 for receiving fasteners.

Figure 7:
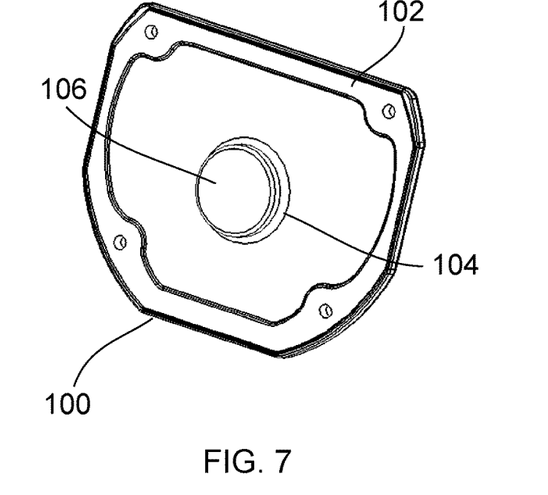
FIG. 7 is a front perspective view of an exemplary rear cover plate.

FIG. 7 shows an exemplary embodiment of a rear cover plate 100 that can be connected to cover the opening defined by the rear of the base 62. The rear cover plate 100 includes an interior surface and an exterior surface. A rim 102 extends around an outer edge of the inner surface that can engage with a gasket. A cylindrical protrusion 104 having an end wall 106 extends from an interior surface of the cover plate. The end wall 106 can be removed, either as a knock-out or through cutting, to provide a wire conduit.

Figure 8:
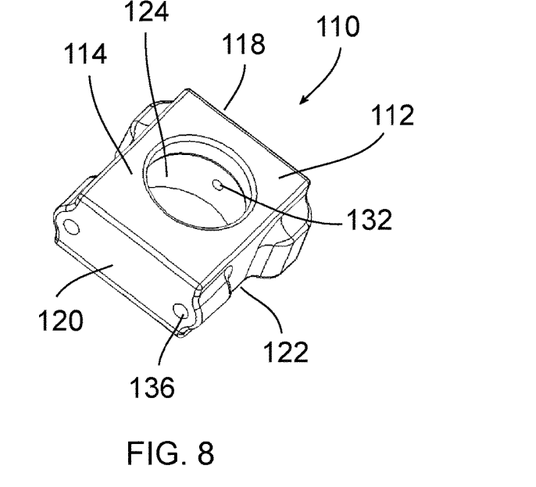
FIG. 8 is a top perspective view of an exemplary straight stanchion adaptor.
Figure 9:
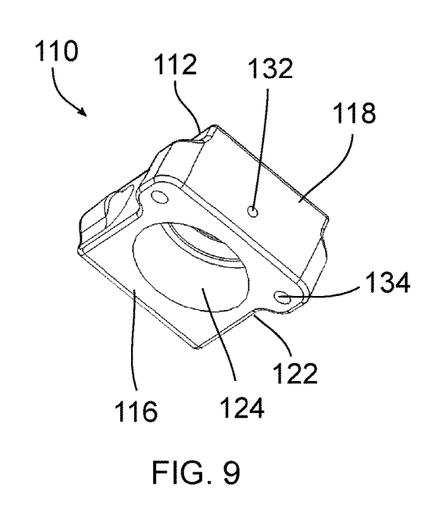
FIG. 9 is a bottom perspective view of FIG. 8.
Figure 10:
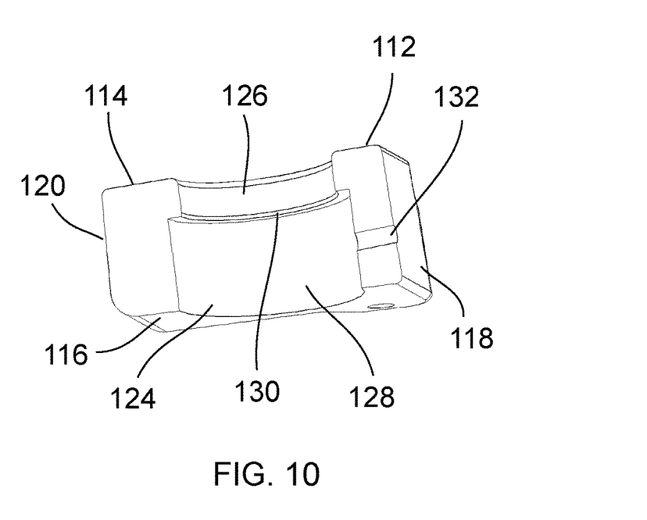
FIG. 10 is a sectional, side perspective view of FIG. 8.

FIGS. 8-10 show an exemplary embodiment of a straight stanchion adaptor 110 that includes a body member 112 having a top wall 114, a bottom wall 116, a rear wall 118, a front wall 120, and a pair of side walls 122. A central opening 124 extends through the body member 112 and is configured to receive a stanchion support. The central opening 124 extends substantially perpendicular with the top and bottom walls 114, 116. The central opening 124 has a first section 126 with a first diameter and a second section 128 with a second diameter larger than the first diameter, forming a rim 130 for receiving an edge of a stanchion support. A rear aperture 132 is provided in the rear wall 118 to receive a set screw (not shown). A pair of bottom apertures 134 and front apertures 136 are configured to connect the straight stanchion adaptor 110 to the side mounting component 60.

Figure 11:
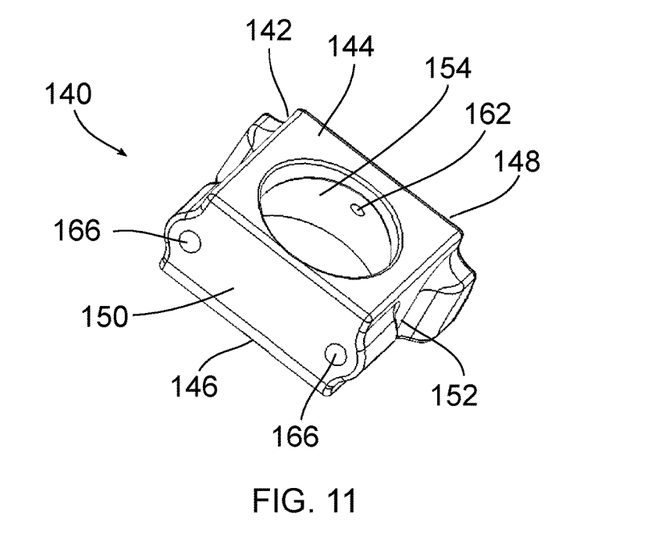
FIG. 11 is a top perspective view of an exemplary angled stanchion adaptor.
Figure 12:
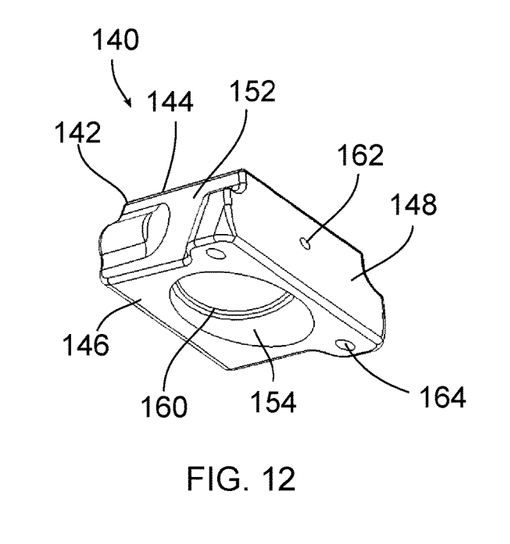
FIG. 12 is a bottom perspective view of FIG. 11.
Figure 13:
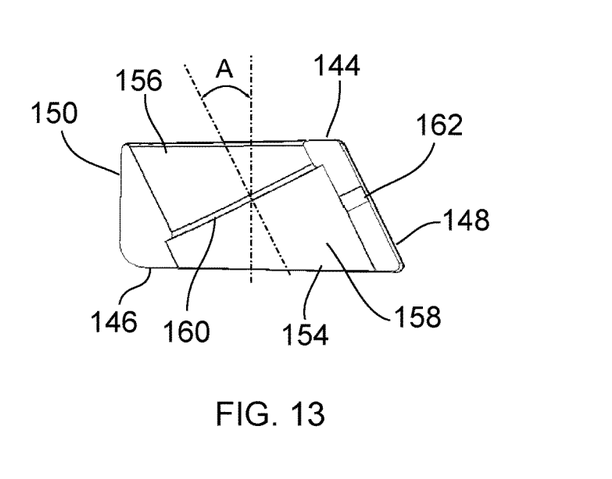
FIG. 13 is a sectional, side view of FIG. 11.

FIGS. 11-13 shows an exemplary embodiment of an angled stanchion adaptor 140 that includes a body member 142 having a top wall 144, a bottom wall 146, a rear wall 148, a front wall 150, and a pair of side walls 152. A central opening 154 extends through the body member 142 and is configured to receive a stanchion support. The central opening 154 extends oblique to the top and bottom walls 144, 146. In an exemplary embodiment the opening extends at a 25° angle A measured from the vertical axis to the top and bottom walls 144, 146. The central opening 154 has a first section 156 with a first diameter and a second section 158 with a second diameter larger than the first diameter, forming a rim 160 for receiving an edge of a stanchion support. A rear aperture 162 is provided in the rear wall 148 to receive a set screw. A pair of bottom apertures 164 and front apertures 166 are configured to connect the angled stanchion adaptor 140 to the side mounting component 60.

Ceiling/Pendant Mount

Figure 14:
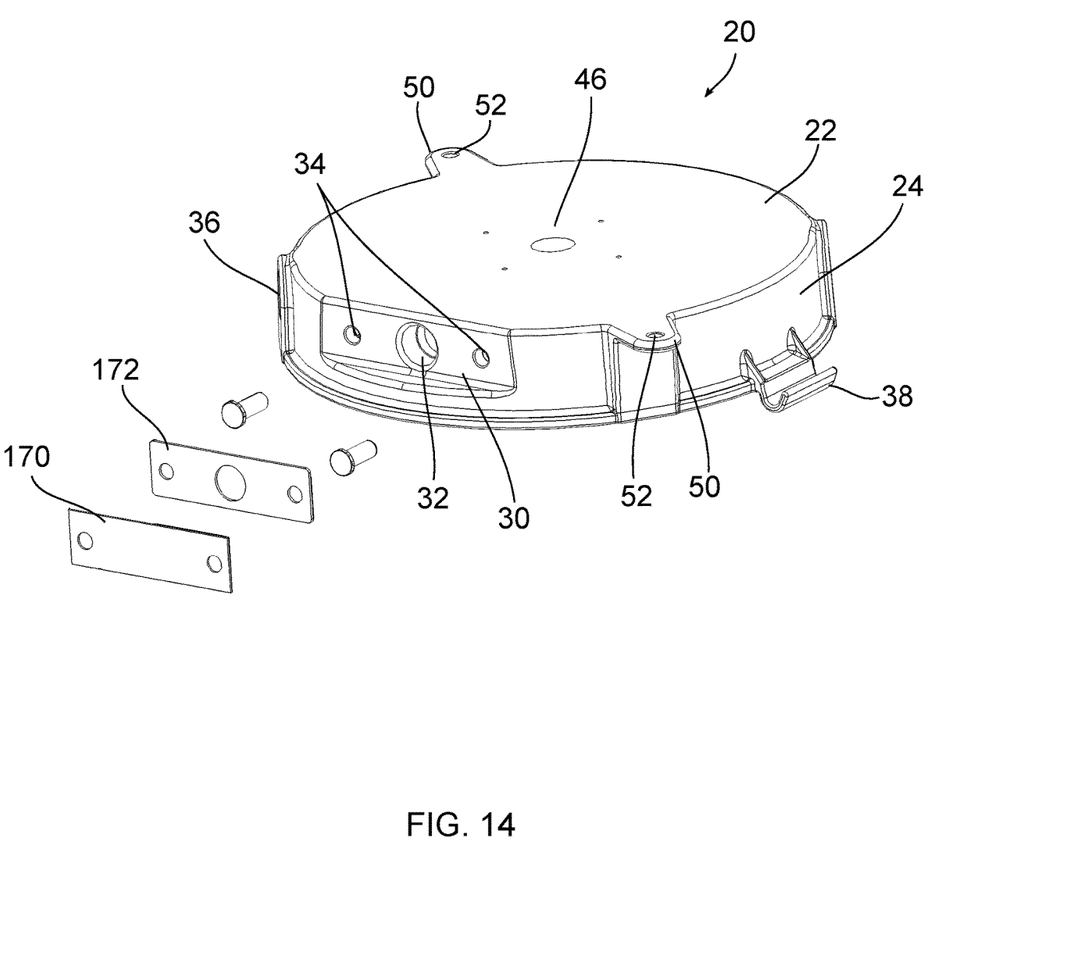
FIG. 14 is an exploded view of an exemplary pendant/ceiling mount assembly.

FIG. 14 shows an exemplary setup for a ceiling or pendant mount configuration. Only the top mounting component 20 needs to be used and a side cover plate 170 can be connected to the recessed portion 30 to cover the conduit 32. A gasket 172 can be positioned between the cover plate 170 and the top mounting component 20. The top mounting component 20 is secured in position by connecting it to a structure, such as a ceiling, through the arms 50 or connecting a pendant mount to the central opening 46. In a ceiling mount configuration, the central opening 46 or the secondary conduits 36 can be used to run electrical conductors to or from the interior chamber 26. In a pendant mount configuration, electrical conductors typical extend through the pendant support.

Wall Mount

Figure 15:
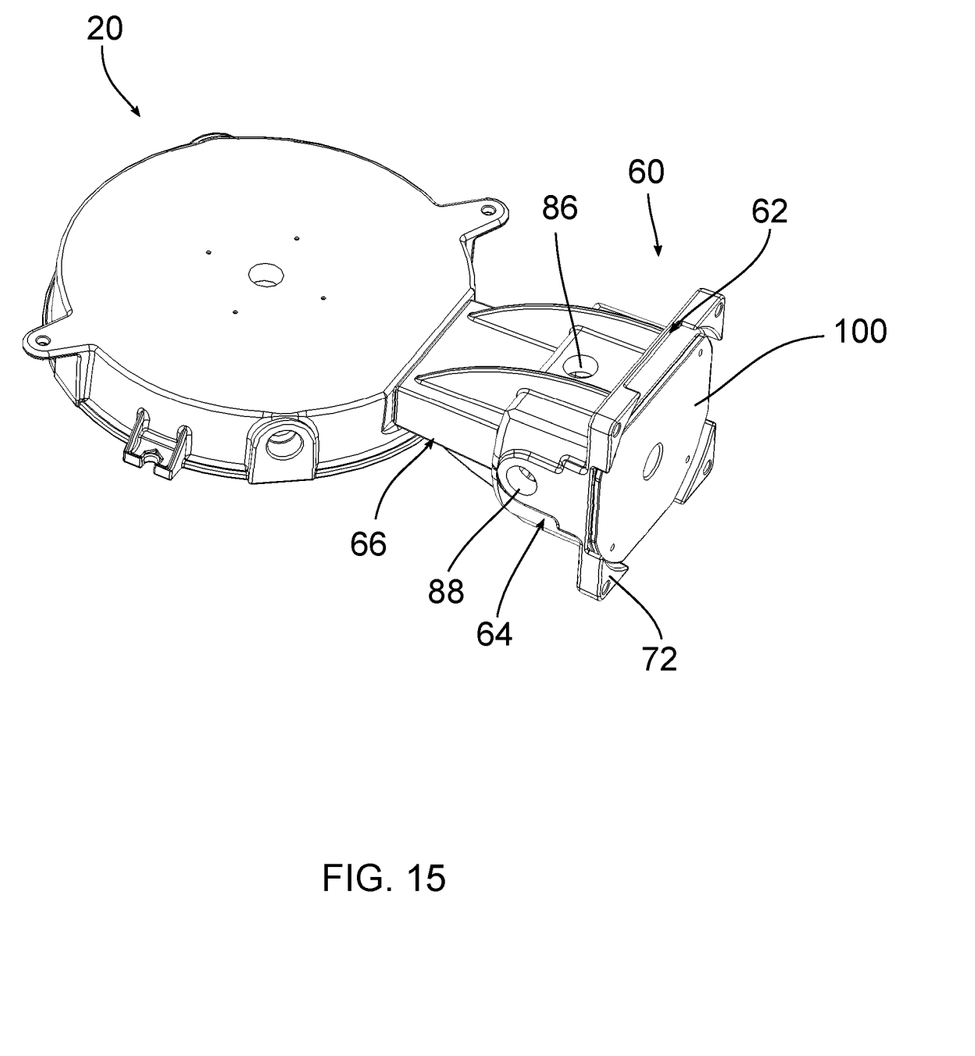
FIG. 15 is a top perspective view of an exemplary wall mount assembly.
Figure 16:
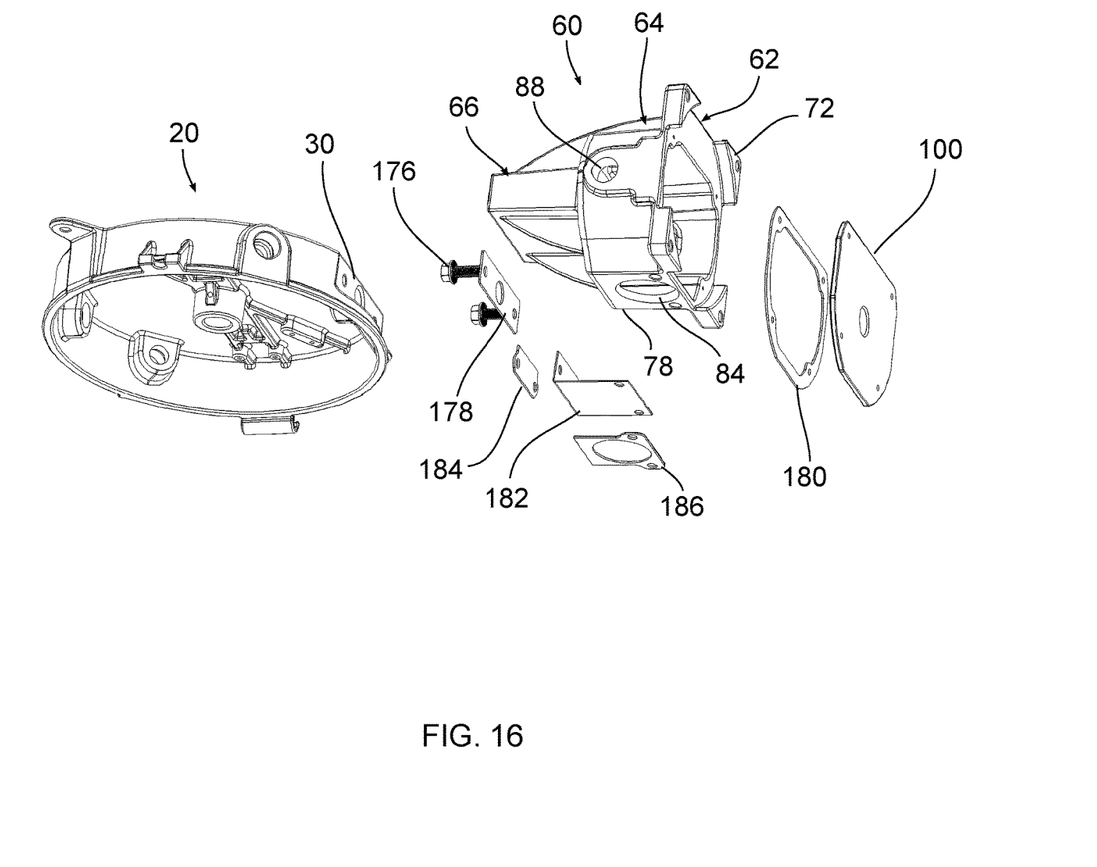
FIG. 16 is an exploded view of the wall mount assembly of FIG. 15.

FIGS. 15 and 16 show an exemplary setup for a wall mount configuration. The side mounting component 60 is connected to the recessed portion 30 of the top mounting component 20 through a set of fasteners 176. A gasket 178 can be positioned between the side mounting component 60 and the top mounting component 20. The rear cover plate 100 is connected to the base 62 of the side mounting component 60 and a gasket 180 is positioned therebetween. An L-shaped cover plate 182 is connected to the bottom wall 78 of the first body portion 64 to cover the bottom opening 84. A first gasket 184 is positioned between the front of the cover plate 182 and the first body portion 64 and a second gasket 186 is positioned between the bottom of the cover plate 182 and the first body portion 64. The side mounting component 60 is connected to a structure, for example a wall, through fasteners extending through the feet portions 72. Conductors can be feed through the rear cover plate 100 or through the side or top openings 86, 88 in the first body portion 64.

Stanchion Mount

Figure 17:
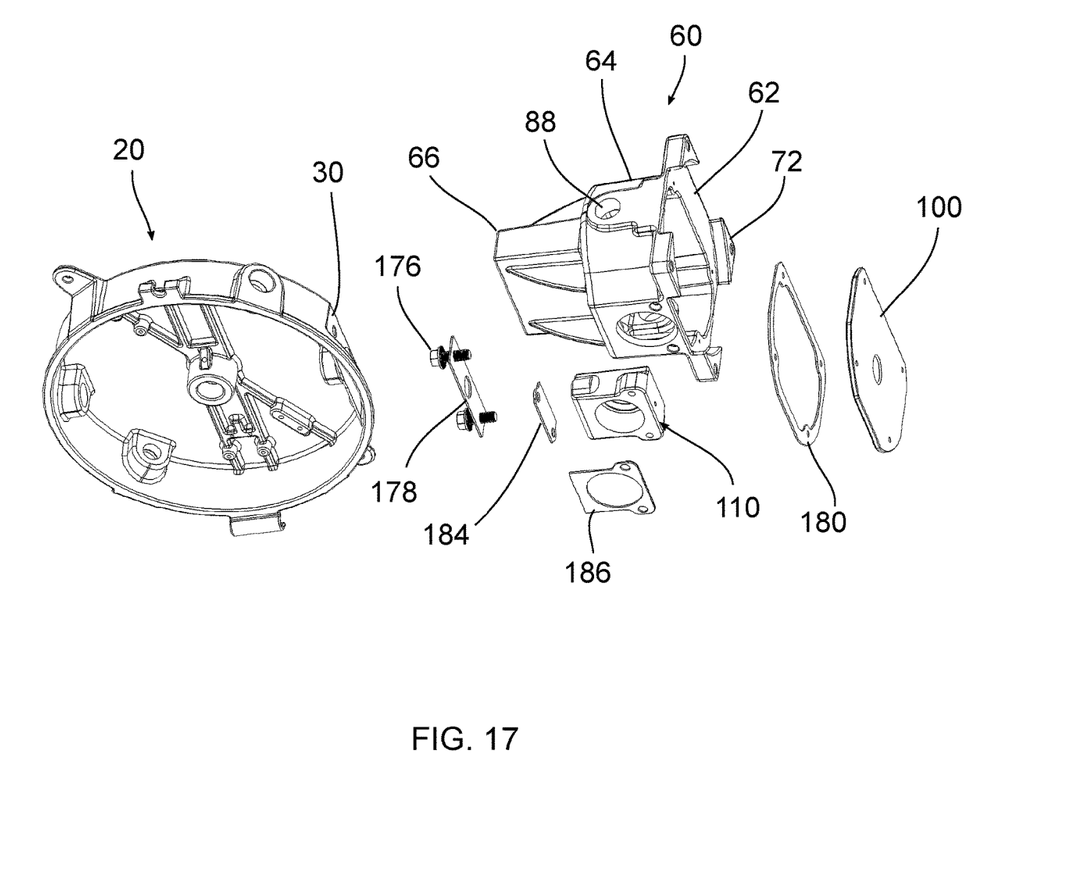
FIG. 17 is an exploded view of an exemplary stanchion mount assembly.

FIG. 17 shows an exemplary setup for a stanchion mount configuration. The side mounting component 60 is connected to the top mounting component 20 and the rear cover plate 100 is connected to the side mounting component 60 as with the wall mount configuration. One of the stanchion adaptors 110, 140 (the straight stanchion adaptor 110 is shown) is connected to the interior of the first body portion 64 through one or more fasteners (not shown), for example a first set of fasteners connected to the front of the first body portion 64 and a second set of fasteners connected to the bottom wall 78 of the first body portion 64. A first gasket 184 is positioned between the front wall 120 of the stanchion adapter 110 and the first body portion 64 and a second gasket 186 is positioned between the bottom wall 116 of the stanchion adaptor 110 and the first body portion 64. The stanchion adaptor 110 is then connected to a stanchion (not shown). A set screw can be inserted through the rear aperture 132 of the adaptor 110 to further secure the adaptor 110 to the stanchion.

The foregoing detailed description of the certain exemplary embodiments has been provided for the purpose of explaining the principles of the invention and its practical application, thereby enabling others skilled in the art to understand the invention for various embodiments and with various modifications as are suited to the particular use contemplated. This description is not necessarily intended to be exhaustive or to limit the invention to the exemplary embodiments disclosed. Any of the embodiments and/or elements disclosed herein may be combined with one another to form various additional embodiments not specifically disclosed. Accordingly, additional embodiments are possible and are intended to be encompassed within this specification and the scope of the appended claims. The specification describes specific examples to accomplish a more general goal that may be accomplished in another way.

As used in this application, the terms "front," "rear," "upper," "lower," "upwardly," "downwardly," and other orientational descriptors are intended to facilitate the description of the exemplary embodiments of the present invention, and are not intended to limit the structure of the exemplary embodiments of the present invention to any particular position or orientation. Terms of degree, such as "substantially" or "approximately" are understood by those of ordinary skill to refer to reasonable ranges outside of the given value, for example, general tolerances associated with manufacturing, assembly, and use of the described embodiments.

What is claimed:

1. A luminaire mounting assembly comprising:
   a top mounting component having a top body defining an interior chamber and configured to receive a luminaire, wherein the top mounting component is configured to be connected to a horizontal support and configured to be connected a pendant mount;
   a side mounting component having a base configured to connect to a vertical support and a body portion extending from the base, wherein the body portion is configured to connect to the top mounting component; and
   a stanchion adaptor configured to connect to the side mounting component and having a stanchion opening configured to receive a stanchion mount,
   wherein the side mounting component includes a pair of feet extending from the base to offset the base from the vertical support.

2. The mounting assembly of claim 1, wherein the top mounting component includes a recess configured to receive the side mounting component.

3. The mounting assembly of claim 2, wherein the recessed portion includes a conduit opening.

4. The mounting assembly of claim 1, wherein the top mounting component includes a top wall and connecting features extending from an interior surface of the top wall, wherein the connecting features are configured to connect to one or more control components.

5. The mounting assembly of claim 1, wherein the top mounting component includes a top wall having a central opening configured to receive the pendant mount.

6. The mounting assembly of claim 1, wherein the top mounting component includes a pair of arms extending from the top body to connect to the horizontal surface.

7. The mounting assembly of claim 1, wherein the stanchion adaptor includes a top wall and a bottom wall, and the stanchion opening extends substantially perpendicular to the top wall and the bottom wall.

8. The mounting assembly of claim 1, wherein the stanchion adaptor includes a top wall and a bottom wall, and the stanchion opening extends at an oblique angle to the top wall and the bottom wall.

9. A luminaire mounting assembly comprising:
   a top mounting component having a top wall and a side wall extending from the top wall, the top wall and side wall defining an interior chamber, the side wall including a recessed portion, and a hook and attachment component extending from the sidewall to connect a luminaire to the top mounting component;
   a side mounting component having a base and a body portion extending from the base, the body portion is configured to connected to the recessed portion of the top mounting component side wall; and
   a stanchion adaptor including an adaptor body having a top wall, a bottom wall, an opening extending between the top wall and the bottom wall, and a rim positioned in the opening.

10. The mounting assembly of claim 9, wherein the top mounting component top wall includes a central opening configured to receive a pendant mount.

11. The mounting assembly of claim 9, wherein the top mounting component includes a pair of arms configured connect to a horizontal surface.

12. The mounting assembly of claim 9, wherein the recessed portion includes a conduit opening.

13. The mounting assembly of claim 9, wherein a hook extends from the side wall and is configured to pivotally receive the luminaire.

14. The mounting assembly of claim 9, wherein the side mounting component includes a rib extending from the body portion to the base.

15. The mounting assembly of claim 9, wherein the stanchion opening extends substantially perpendicular to the stanchion top wall and the bottom wall.

16. The mounting assembly of claim 9, wherein the stanchion opening extends at an oblique angle to the stanchion top wall and the bottom wall.

17. The mounting assembly of claim 9, wherein the stanchion opening includes a first section having a first diameter and a second section having a second diameter greater than the first diameter.

18. A luminaire mounting assembly comprising:
a top mounting component having a top body defining an interior chamber and configured to receive a luminaire, wherein the top mounting component is configured to be connected to a horizontal support and configured to be connected a pendant mount;
a side mounting component having a base configured to connect to a vertical support and a body portion extending from the base, wherein the body portion is configured to connect to the top mounting component; and
a stanchion adaptor configured to connect to the side mounting component and having a stanchion opening configured to receive a stanchion mount,
wherein the top mounting component includes a pair of arms extending from the top body to connect to the horizontal surface.

19. The mounting assembly of claim 18, wherein the top mounting component includes a recess configured to receive the side mounting component.

20. The mounting assembly of claim 18, wherein the top mounting component includes a top wall and connecting features extending from an interior surface of the top wall, wherein the connecting features are configured to connect to one or more control components.

21. The mounting assembly of claim 1, wherein the side mounting component includes a pair of feet extending from the base to offset the base from the vertical support.

* * * * *